(No Model.) 2 Sheets—Sheet 1.
G. F. GODLEY.
CAR SPRING.
No. 267,341. Patented Nov. 14, 1882.
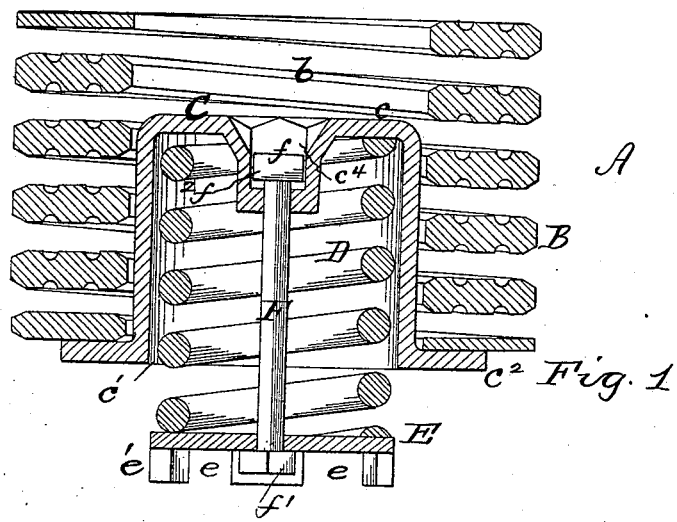
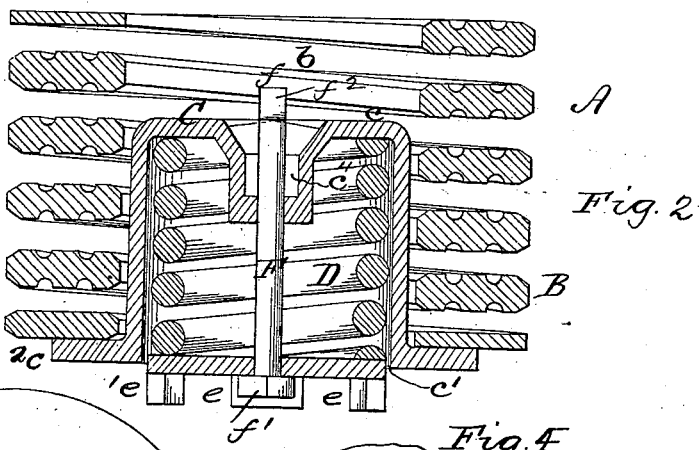
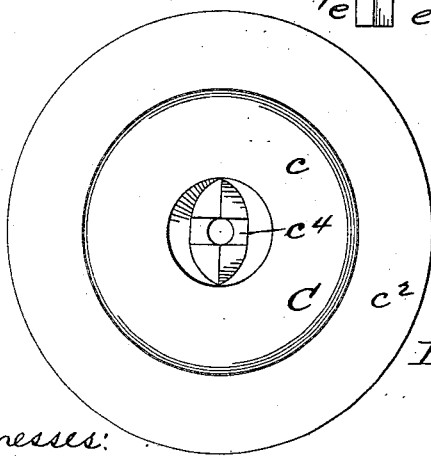
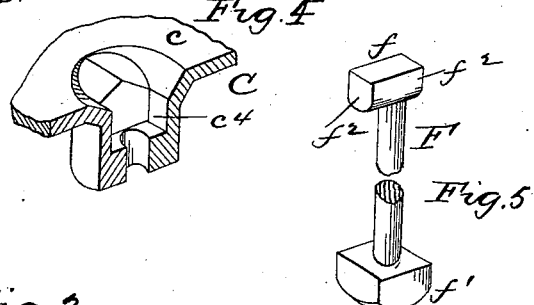
Witnesses:
Inventor,
George F. Godley
By S. J. Van Stavoren
Attorney.

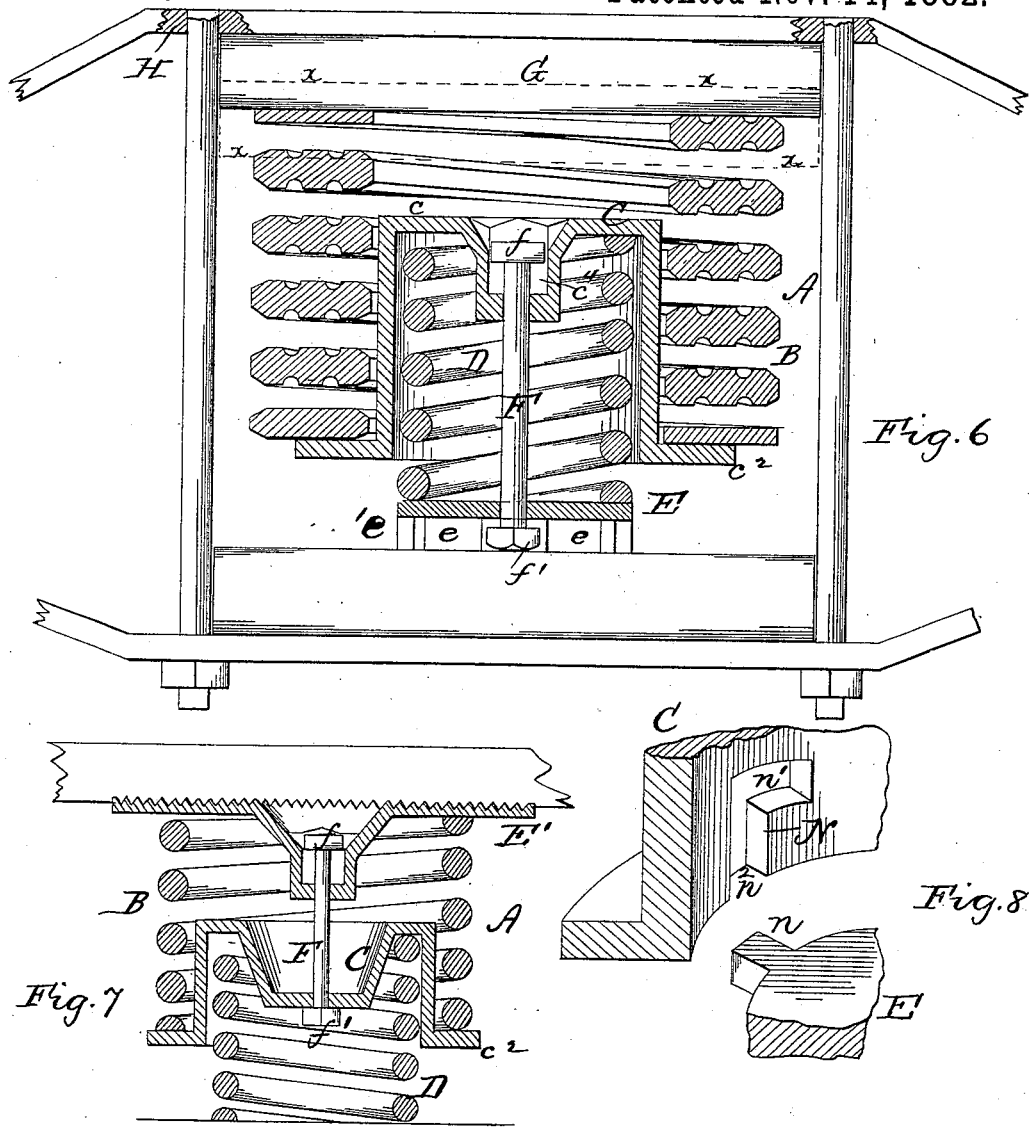

UNITED STATES PATENT OFFICE.

GEORGE F. GODLEY, OF PHILADELPHIA, PENNSYLVANIA.

CAR-SPRING.

SPECIFICATION forming part of Letters Patent No. 267,341, dated November 14, 1882.

Application filed July 31, 1882. (No model.)

*To all whom it may concern:*

Be it known that I, GEORGE F. GODLEY, a citizen of the United States, residing at Philadelphia, in the county of Philadelphia and State of Pennsylvania, have invented certain new and useful Improvements in Car-Springs, of which the following is a specification, reference being had therein to the accompanying drawings.

Figure 1 is a transverse vertical section of a spring embodying my invention. Fig. 2 is a like view showing the spring compressed. Fig. 3 is a plan of the case. Fig. 4 is a detail sectional perspective of same. Fig. 5 is a broken perspective of the clamping bolt or lock. Fig. 6 is an elevation, partly sectional, illustrating my improved spring in position between the bolsters of a car-truck. Fig. 7 is a transverse vertical section of a modification; and Fig. 8 represents detail sectional perspectives of a modification of locking mechanism for maintaining the compression of the spring.

My invention has relation to springs for railroad-cars, and has special reference to the bolster or bearing springs.

It has for its object to provide a spring which may be readily and quickly inserted between the truck and spring bolsters, or between the bearings for the spring, and removed therefrom without necessitating the unscrewing of the bolts which secure together the arch and guide-bars of the car-truck, or without disarranging the straps or bearings for the spring. The latter, when in its normal position and condition, effectually keeps the truck-bolster in impingement with the arch-bars of the truck.

My invention has for its further object to provide a bolster or bearing spring of less than the usual height, constructed and arranged to have more than the customary range of motion incident to springs of like height as heretofore constructed.

Railroad-car trucks as at present made have about six inches or a limited space between the truck and spring-bolsters. Such distance governs or determines the height of the springs employed. It is desirable to have the springs so constructed that they will cause the truck-bolster to bear firmly against the arch-bars of the truck. Heretofore such result has been obtained by making the springs from about one-fourth to three-eighths of an inch higher than the normal distance between the bolsters, in order that when a car is let down upon the truck-bolsters the springs are compressed said one-fourth to three-eighths of an inch, such compression acting to keep the truck-bolster in its proper position. While such described arrangement accomplishes the result stated, yet serious disadvantages follow therefrom, which entail great annoyance and expense in the building of the car-trucks and in the operation of removing worn-out or a broken set of springs from the trucks, to replace them with new ones. For instance, in constructing a truck, the springs as heretofore made must be placed in position between the bolsters before the arch and guide bars are screwed together. Otherwise the truck-bolster cannot be raised sufficiently to admit of the insertion of the springs beneath the same, while, on the other hand, when such springs have become set or broken, they can only be removed by first unscrewing the said fastenings of the arch and guide-bars and then jacking or forcing the bolsters apart the required distance necessary to effect the withdrawal of such springs and their replacement with new ones. It often occurs that such screw-bolts or fastenings have become so rusted together that it is impossible to disconnect them except by breaking them apart, thereby stripping the threads on the bolts and rendering them unfit for further use. Such parts must therefore be replaced, to do which the car is sent to the repair-shop, thus occasioning a double loss—first, the expense of repairs, and, second, the loss to the company by reason of non-use of such car. The use of my improved springs avoids all such disadvantages, annoyance, and expense, as they can be placed between the bolsters or their bearings after all the parts of the truck have been secured together, and when the springs are worn out they can be removed therefrom and be replaced with new ones without disarranging the fastenings of the car-truck or any portion of the car and without necessitating the jacking apart of the bolsters beyond their normal limit of separation. Such removal and replacement may be effected while the car stands upon the track, and need not, therefore, be sent to the repair-shop nor be laid up from use for any extended length of time.

My invention accordingly consists, first, in the provision of a spring constructed and arranged to be temporarily compressed and be locked or held compressed until it is placed between its bearings, when it is then unlocked or permitted to expand; second, in combination with a spring of a lock or clamp adapted and designed to hold the spring in a compressed condition, said lock or clamp being arranged and constructed to be released at any desired period and permit the expansion of the spring; and, third, in the novel combination, construction, and arrangement of the parts of the spring, whereby an increased extent of motion is obtained therefor, as hereinafter specifically described and claimed.

Referring to the accompanying drawings, A represents a spring designed in accordance with my invention, and consists of an exterior spiral or spring, B, made of an edge-coiled bar of the shape in cross-section as illustrated, or said spring may be formed of a round or any other desired configured bar in cross-section. Within its mandrel or central opening, $b$, is placed a box or case, C, having a closed or approximately-closed top, $c$, and an open bottom, $c'$, surrounded by an annular flange, $c^2$, upon which the spring B seats or rests.

Within the casing C is placed one or more spirals, D, of any suitable form in cross-section, or coiled from any desired shape of bar, having a mandrel-opening of any suitable diameter. The spring or springs D rest upon a follower, E, and F is a bolt, clamp, or other device for holding the case and follower in due relation with one another.

If desired, one or more external springs, B, may be employed, and any suitable or desired form of case or box may be substituted for that shown and described. When said parts are arranged together, as illustrated in Fig. 1, the height of spring A is greater than the normal distance between the bolsters of the car-truck, and in such condition could only be placed between said bolsters by resorting to the usual custom of so doing, as above described, for springs as heretofore constructed. To reduce the height of spring A, in order to permit it to be inserted between said bolsters and removed therefrom without disarranging the parts of the car-truck, I compress either the spiral B or D and maintain such compression until spring A is in position for service.

In Fig. 2 I have shown the spiral D compressed and held in such condition by means of the bolt F. The latter is formed with a projection or head, $f\,f'$, on each end, the upper head, $f$, being preferably made elongated; and $c^4$ is a correspondingly-shaped slot in the top $c$ of box C, so that when spiral D is compressed head $f$ projects beyond the upper edge of top $c$, and by simply turning bolt F until its head $f$ is at right angles with slot $c^4$ the ends $f^2 f^2$ of said head will rest upon the top $c$ and duly maintain spiral D in a state of compression, as shown in Fig. 2. The spring A is therefore reduced in height equal to the extent of such compression, or is so reduced that its height is less than the distance between the bolsters or between the bearings for the spring. Consequently it is easily and quickly inserted therebetween at any desired or suitable time without disarranging the fastenings of said bolsters or bearings.

When in position between the bolsters the spring D is released by turning the bolt F until its head $f$ registers with slot $c^4$, whereupon spring D expands, elevates case C, or its equivalent, and spiral B, causing the latter to raise the truck-bolster G until it impinges against the arch-bar H, as shown in Fig. 6, the dotted lines $x\,x$ in said figure indicating the position of the bolster G before spiral D is released.

To permit the turning of bolt F the follower E is made skeleton form or provided with a series of openings $e\,e$ in its flange $e'$, as shown, through which a wrench or bar is inserted to turn said bolt.

If desired, the upper edge of top $c$, surrounding slot $c^4$, may be formed with a cam-shaped elevation, as shown in Fig. 4, to facilitate the turning of bolt F or to permit the jarring, jolting, or vibration of a moving car, to further compress said spring and automatically turn bolt F in case the attendant or workman should fail or neglect to rotate such bolt after placing the springs in position.

I prefer to compress spiral or spirals D; but I do not limit my invention thereto, for, if the follower E be placed upon spring B and the bolt F arranged substantially as shown in Fig. 7, said spring or springs B may be compressed. In said figure I have shown a follower or casing, E', the top surface of which is made corrugated or otherwise suitably formed to permit the bolster G to embed itself in the corrugations to hold said follower or case in position. Such corrugations are used in place of the retaining-pins heretofore employed. When the springs D are compressed I prefer to compress them to about the extent that an empty car would do if placed thereon, so that when arranged in position on the spring-bolster the bolt F can readily be released.

I have represented the coils or spirals B and D of such thickness through their transverse section and of a pitch that one will be of a different capacity from that of the other; but both springs may be of the same capacity. The spring B, being of a large diameter, has considerably more motion in proportion to its height than it otherwise would have if made smaller in diameter, and it is so arranged in relation to the casing C that said spring will not be quite exhausted when the truck-bolster comes down on the top $c$ of said casing, thereby protecting the coils of said spring from coming in contact with each other. In case, however, spring B should break, the case C holds the broken parts of said spring in position, and they would still be of service, although, of course, only in a modified degree.

If desired, the bolt F may be dispensed with and lateral lugs $n$ be cast on the follower E, which are designed to enter L-shaped slots N in the casing. When spring D is compressed said lugs enter the horizontal part $n'$ of slots N, and remain therein to retain said spring in its compressed condition. By turning the follower E around until the lugs $n$ register with the vertical part $n^2$ of said slots the spring is unlocked and expands. When the springs A are worn out or it is desired to remove them from the bolsters the bolt F or clamp used is locked, as above described, compressing spring D or B, whereupon the entire spring A may be removed, as above set forth.

What I claim as my invention is—

1. A car-spring provided with a clamp, bolt, or locking device for maintaining said spring or springs in a state of compression, substantially as shown, and for the purpose set forth.

2. A car-spring provided with mechanism for holding it in a compressed condition, said mechanism being designed and adapted to be operated to release said spring and allow it to expand when placed between its bearings, substantially as shown and described.

3. A car-spring composed of spirals arranged in cases or placed between plates connected together by mechanism for locking the spirals in a compressed condition, the exterior bearing-surfaces of said cases or plates being formed with corrugations or series of projections, substantially as shown and described.

4. The case or follower E, having skeleton or recessed portion $e'$, substantially as shown, and for the purpose set forth.

In testimony whereof I affix my signature in presence of two witnesses.

GEORGE F. GODLEY.

Witnesses:
S. J. VANSTAVOREN,
CHAS. F. VAN HORN.